April 29, 1952   E. R. SMITH   2,594,694
INTERMITTENT AND PROPORTIONATE PATTERN CONTROL
MECHANISM FOR MACHINE TOOLS
Filed Dec. 8, 1948   3 Sheets-Sheet 1

INVENTOR.
Edwin R. Smith
BY Chas. P. Hawley
ATTORNEY

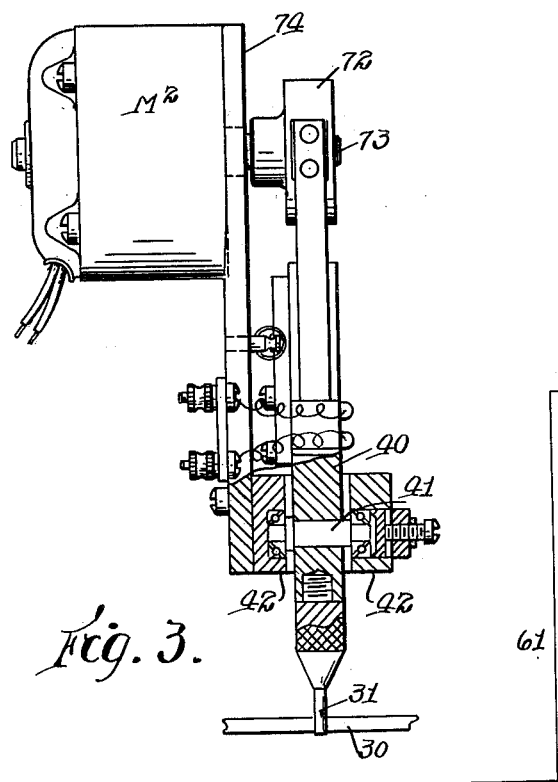
Fig. 3.
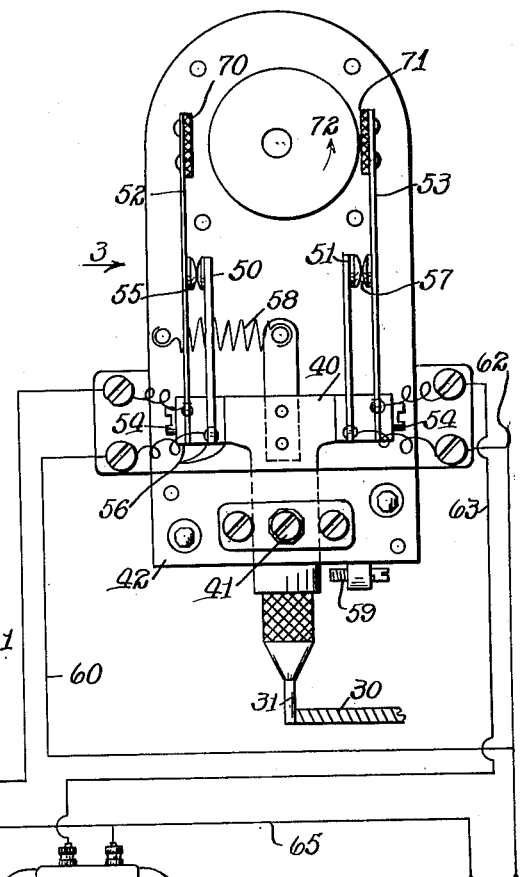
Fig. 2.
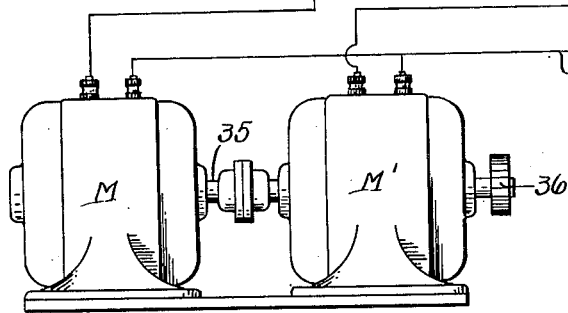
INVENTOR.
Edwin R. Smith.
BY Chas. T. Hawley
ATTORNEY Patented Apr. 29, 1952

2,594,694

UNITED STATES PATENT OFFICE 2,594,694

INTERMITTENT AND PROPORTIONATE PATTERN CONTROL MECHANISM FOR MACHINE TOOLS

Edwin R. Smith, Seneca Falls, N. Y., assignor to Seneca Falls Machine Company, Seneca Falls, N. Y., a corporation of Massachusetts Application December 8, 1948, Serial No. 64,093

2 Claims. (Cl. 318—162)

This invention relates to machine tools in which work pieces are produced by the operation of a forming element on successive work pieces. More specifically, the invention relates to pattern control mechanism of the general type shown in my prior application Serial No. 25,813 filed May 8, 1948, now abandoned.

In said application, the position of the forming element was determined by the coacting operation of two opposed power devices, such as torque motors, which in turn were rendered active or inactive by a pattern and a coacting stylus or pattern-following element.

When the stylus was displaced in either direction from its normal mid-position, the operating circuit of one of the torque motors was opened and the other motor became effective to shift the forming element toward or away from the work until the stylus was returned to mid-position and the opened circuit was again closed.

It is the general object of the present invention to provide means for intermittently opening and closing the operating circuit of the motor which is to be wholly or partially inactive during the adjustment of the forming element and for proportioning the relative lengths of the open and closed intervals to the amount of the required adjustment. For a larger adjustment, the open intervals will be proportionately greater, and the adjustment will be more rapid.

The invention is shown and described in connection with its application to a contour-turning attachment for a lathe. But it is to be understood that the invention is not limited to this particular type of machine, as it could also be used for contour-milling, shaping, flame-cutting, grinding and other similar purposes.

My invention further relates to arrangements and combinations of parts which will be hereinafter described and more particularly pointed out in the appended claims.

Preferred forms of the invention are shown in the drawings, in which:

Fig. 2 is a diagrammatic front view of the torque motors and the pattern control mechanism;

Fig. 3 is a side elevation of the pattern control mechanism, partly in section and looking in the direction of the arrow 3 in Fig. 2.

Figure 1:
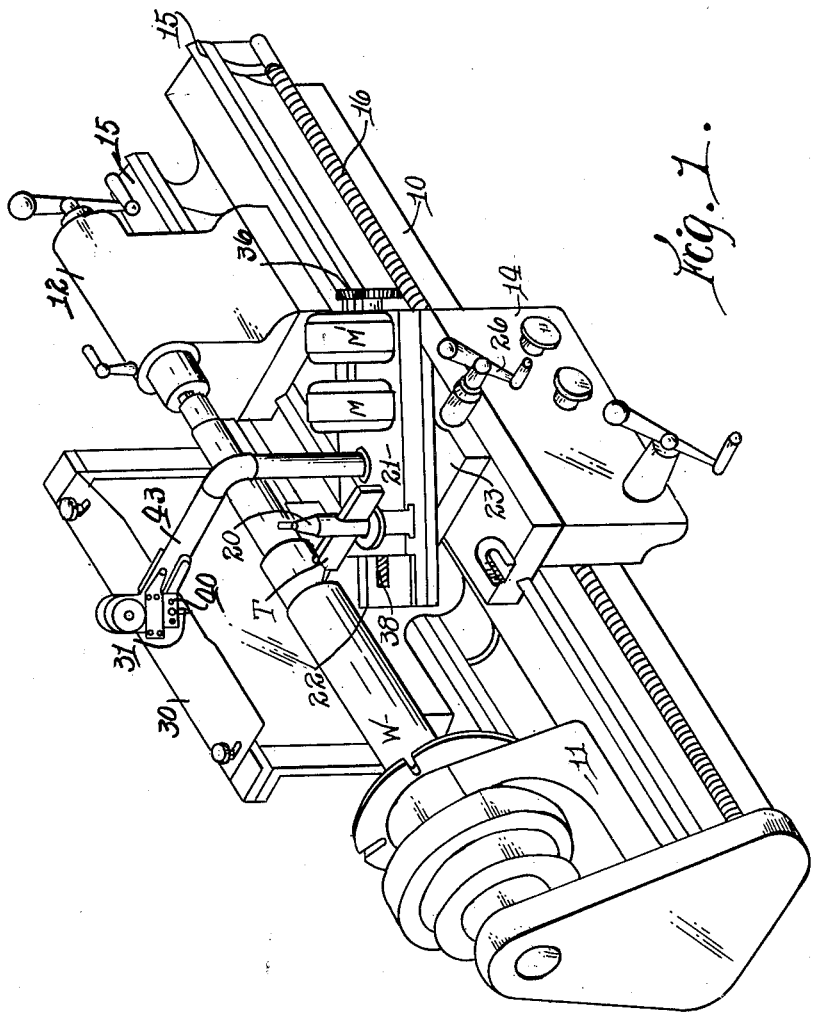
Fig. 1 is a perspective view showing the invention as applied to a lathe.

Referring particularly to Fig. 1, I have shown my invention as embodied in an engine lathe comprising a base or frame 10, a headstock 11, a tailstock 12 and a tool carriage 14 slidable on ways 15 and moved by the usual longitudinal feed-screw 16. A piece of work W is shown as mounted on centers in the headstock 11 and tailstock 12.

A cutting tool T is mounted in a tool-post 20 which is secured to a tool-slide 21 which is slidably mounted on a guide-plate 22. The plate 22 is angularly adjustable on a table 23 which in turn is slidably mounted in guideways on the tool carriage 14. Manual adjustment of the tool T toward or away from the work is effected by a feed-screw handle 26 at the front of the carriage 14.

All of the parts thus far described are or may be of any usual commercial construction and in themselves form no part of the present invention, which relates particularly to intermittently-operating pattern control mechanism for moving the tool-slide 21 along its guideways toward or away from the work as indicated by the coaction of a template 30 and a stylus 31.

The automatic in-and-out adjustment of the tool along the guide-plate 22 is effected by a pair of motors M and M' mounted on the tool slide 21. The armatures of these motors are shown mounted on a single armature shaft 35 which extends to the right in Fig. 2 and which carries a pinion 36 engaging a gear 37 on the cross feed screws 38 for the tool slide 21.

The motors M and M' are of the "torque" type and are so constructed that they will safely carry a full-load current while at rest, and the motors M and M' are connected so that their normal directions of rotation are opposed. The motors are usually of approximately the same size and capacity and substantially neutralize each other when both operating circuits are closed.

In other words, so long as the operating circuits of both motors remain closed, the feed-screw 38 remains stationary, and the tool T is neither advanced nor withdrawn with respect to the work as the tool carriage 14 is fed lengthwise of the work. If, however, the load circuit of either motor M or M' is opened, the other motor immediately becomes active and turns the feed-screw 38 in a predetermined direction to adjust the tool T in or out with respect to the work W.

The stylus 31 is mounted in a T-shaped member 40 pivoted at 41 in a frame 42. The frame 42 is supported by a post 43 mounted on the slide 21 and angularly adjustable thereon.

Rigid contact plates 50—51 and flexible contact plates 52—53 are secured in pairs to the pivoted member 40 by screws 54 but are insulated therefrom and from each other by insulating blocks 55. The associated plates 50—52 have coacting contacts 56 and the associated plates 51—53 have similar contacts 57. A tension spring 58 swings the lower end of the member 40 against a stop screw 59 when the stylus 31 is out of engagement with the pattern 30.

Wires 60 and 61 are connected to the contact plates 50 and 52 respectively, and wires 62 and 63 are similarly connected to the plates 51 and 53. The wire 60 is connected to the wire 62, which is a power line. The wire 61 is connected to the motor M and the wire 63 to the motor M'. Both motors are directly connected to the return power line 65.

The flexible contact plates 52—53 are extended upward and have insulating pads 70—71 positioned for engagement by a cam or eccentric 72 on the armature shaft 73 of a motor M2 which runs continuously. The motor M2 is mounted on an upright post 74 (Fig. 3) secured to the frame 42 on the post 43. The pads 70—71 are normally spaced apart slightly more than twice the greatest radius of the cam or eccentric 72.

When the stylus 31 is displaced by the pattern 30 or is swung counter-clockwise by the spring 58, one of the pads 70—71 will be engaged by the eccentric 72 and the corresponding contacts 56 or 57 will be opened, thus deenergizing one motor M or M' and permitting the other motor to adjust the tool T in or out as required.

The motor circuit is broken for a part only of each revolution of the cam or eccentric 72, and this open period will be determined by the amount of angular displacement of the member 40 and the rigid plates 50—51 mounted thereon. The greater the displacement, the longer the circuit is held open on each revolution of the cam or eccentric 72.

As both motors are at all times under load and ready to act instantly when released, very prompt and effective adjustment of the tool T follows any change in outline of the template 30 which occasions swinging movement of the stylus 31 and permits one or the other motor to become active. Furthermore, the rate of adjustment always corresponds to the indicated amplitude of the required tool adjustment.

While the motors M and M' are shown connected with a common drive shaft 35, other arrangements are optional, so long as both motors M and M' are operatively connected to the feedscrew 38.

For a more detailed description of the method of operation of the torque motors, reference is made to the prior application above identified.

Figure 4:
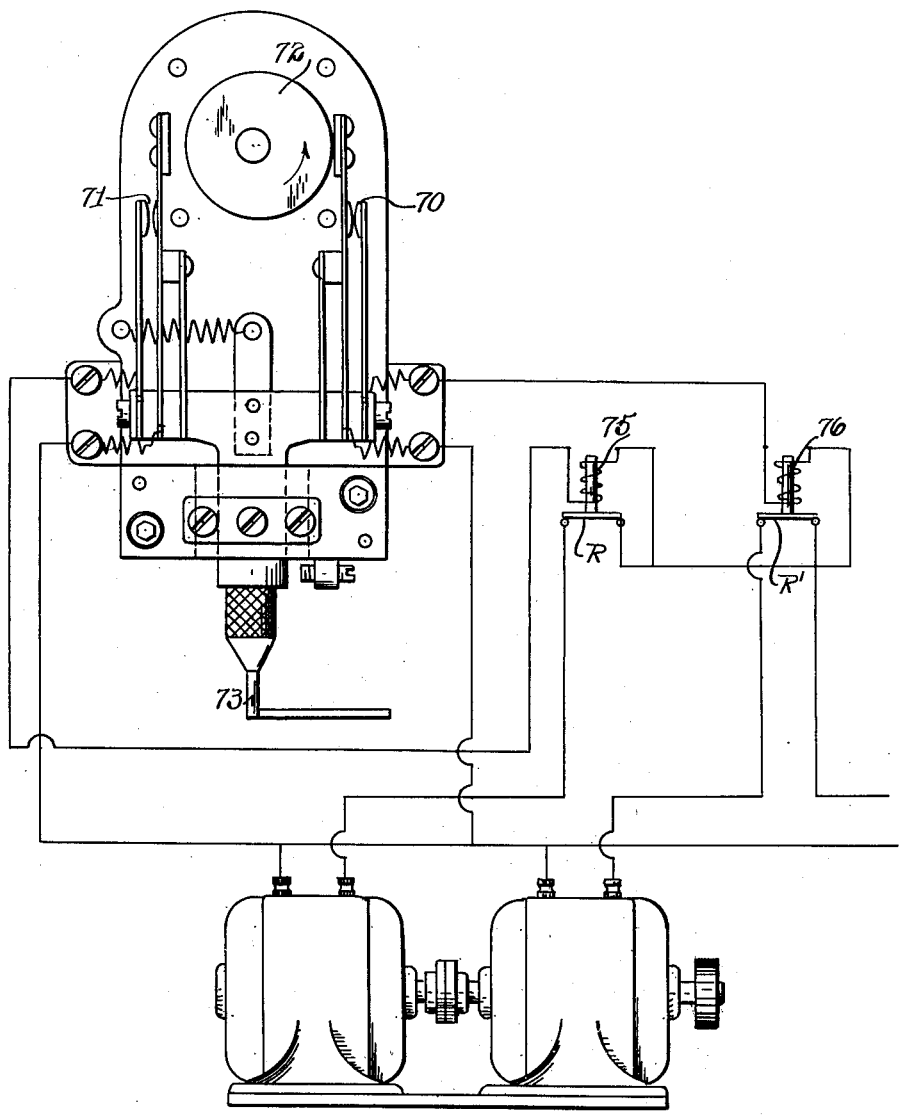
Fig. 4 is a view similar to Fig. 2 but showing a modified construction.

In the construction shown in Fig. 4, the pairs of contacts 70 and 71 are normally open and are intermittently closed by the rotating eccentric 72 when the stylus 73 is displaced from mid-position. When either pair of contacts is closed, an associated solenoid 75 or 76 is energized to open a normally-closed relay switch R or R' in the power circuit of one of the torque motors M or M'. Otherwise, the construction and operation is as previously described.

Having thus described my invention and the advantages thereof, I do not wish to be limited to the details herein disclosed, otherwise than as set forth in the claims, but what I claim is:

1. In a machine, a pair of opposed torque motors alternately operative to produce opposite results in said machine, a pattern, and control connections between said pattern and said motors which include operating circuits through which said motors are rendered selectively effective to produce one or the other of said results, and said control connections including a continuously-rotated cam, a pair of normally-closed contacts in the operating circuit of each motor, means controlled by said pattern to move a selected pair of closed contacts into the path of said cam on indication by said pattern, and devices to effect relative movement between said pattern and said controlled means, and one of said contacts being displaced to open the circuit of the associated motor when said contact is positioned in the path of said cam and is engaged thereby.

2. The combination in a machine as set forth in claim 1, in which the cam is eccentric and rotated and in which the duration of the open-circuit condition is directly proportional to the control action of the pattern.

EDWIN R. SMITH.

REFERENCES CITED

The following references are of record in the file of this patent:

UNITED STATES PATENTS

| Number | Name | Date |
|---|---|---|
| 1,711,290 | Shaw | Apr. 30, 1929 |
| 1,877,605 | Shivers | Sept. 13, 1932 |
| 2,162,491 | Rosen | June 13, 1939 |
| 2,364,873 | Rosen | Dec. 12, 1944 |
| 2,372,604 | Rosen | Mar. 27, 1945 |
| 2,373,332 | O'Neill | Apr. 10, 1945 |
| 2,437,570 | Von Zelewsky | Mar. 9, 1948 |